US006078884A

United States Patent [19]

Downey

[11] Patent Number: 6,078,884

[45] Date of Patent: Jun. 20, 2000

[54] PATTERN RECOGNITION

[75] Inventor: Simon N. Downey, Suffolk, United Kingdom

[73] Assignee: British Telecommunications public limited company, London, United Kingdom

[21] Appl. No.: 09/011,903

[22] PCT Filed: Aug. 23, 1996

[86] PCT No.: PCT/GB96/02069

§ 371 Date: Mar. 26, 1998

§ 102(e) Date: Mar. 26, 1998

[87] PCT Pub. No.: WO97/08684

PCT Pub. Date: Mar. 6, 1997

[30] Foreign Application Priority Data

Aug. 24, 1995 [EP] European Pat. Off. .............. 95305982

[51] Int. Cl.[7] ............................ G10L 15/08; G10L 15/20

[52] U.S. Cl. .......................... 704/243; 704/256; 704/259; 704/248

[58] Field of Search .................................... 704/243, 256, 704/259, 248

[56] References Cited

U.S. PATENT DOCUMENTS

| | | | |
|---|---|---|---|
| 4,811,399 | 3/1989 | Landell et al. | 704/256 |
| 5,333,275 | 7/1994 | Wheatley et al. | 704/256 |
| 5,721,808 | 2/1998 | Minami et al. | 704/256 |

FOREIGN PATENT DOCUMENTS

A 0 248 609 12/1987 European Pat. Off. .

*Primary Examiner*—David R. Hudspeth
*Assistant Examiner*—Oauiei Abebe
*Attorney, Agent, or Firm*—Nixon & Vanderhye P.C.

[57] ABSTRACT

Pattern recognition apparatus uses a recognition processor for processing an input signal to indicate its similarity to allowed sequences of reference patterns to be recognised. A speech recognition processor includes a classification arrangement to identify a sequence of patterns corresponding to said input signal and for repeatedly partitioning the input signal into a speech-containing portion and, preceding and/or following said speech-containing portion, noise or silence portions. A noise model generator is provided to generate a pattern of the noise or silence portion, for subsequent use by said classification means for pattern identification purposes. The noise model generator may generate a noise model for each noise portion of the input signal, which may be used to adapt the reference patterns.

12 Claims, 7 Drawing Sheets

PATTERN RECOGNITION

BACKGROUND OF THE INVENTION

1. Field of the Invention

The invention relates to pattern recognition systems for instance speech recognition or image recognition systems.

2. Related Art

Practical speech recognition systems need to be capable of operation in a range of different environmental conditions which may be encountered in every day use. In general, the best performance of such a system is worse than that of an equivalent recogniser designed to be tailored to a particular environment, however the performance of such a recogniser falls off severely as background conditions move away from the environment for which the recogniser has been designed. High levels of ambient noise are one of the main problems for automatic speech recognition processors. Sources of ambient noise include background speech, office equipment, traffic, the hum of machinery etc. A particularly problematic source of noise associated with mobile phones is that emanating from a car in which the phone is being used. These noise sources often provide enough acoustic noise to cause severe performance degradation of a speech recognition processor.

In image processing, for instance handwriting recognition, a user usually has to write very clearly for a system to recognise the input handwriting. Anomalies in a person's writing may cause the system continually to misrecognise.

It is common in speech recognition processing to input speech data, typically in digital form, to a processor which derives from a stream of input speech data a more compact, perceptually significant set of data referred to as a feature set or vector. For example, speech is typically input via a microphone, sampled, digitised, segmented into frames of length 10–20 ms (e.g. sampled at 8 kHz) and, for each frame, a set of coefficients is calculated. In speech recognition, the speaker is normally assumed to be speaking one of a known set of words or phrases, the recogniser's so-called vocabulary. A stored representation of the word or phrase, known as a template or model, comprises a reference feature matrix of that word as previously derived from, in the case of speaker independent recognition, multiple speakers. The input feature vector is matched with the model and a measure of similarity between the two is produced.

In the presence of broadband noise, certain regions of the speech spectrum that are of a lower level will be more affected by the noise than others. Noise masking techniques have been developed in which any spurious differences due to different background noise levels are removed. As described in "A digital filter bank for spectral matching" by D H Klatt, Proceedings ICASSP 1976, pages 573–576, this is achieved by comparing the level of each extracted feature of an input signal with an estimate of the noise and, if the level for an input feature is lower than the corresponding feature of the noise estimate, the level for that feature is set to the noise level. The technique described by Klatt relies on a user speaking a pre-determined phrase at the beginning of each session. The spectrum derived from the input is compared to a model spectrum for that phrase and a normalisation spectrum calculated which is added to all spectrum frames of the utterance for the rest of the session.

Klatt also states that, prior to the normalisation spectrum calculation, a common noise floor should be calculated. This is achieved by recording a one second sample of background noise at the beginning of each session. However this arrangement relies on a user knowing that they should keep silent during the noise floor estimation period and then utter the pre-determined phrase for calculation of the normalisation spectrum.

In the article "Noise compensation for speech recognition using probabilistic models" by J N Holmes and N C Sedgwick, Proceedings ICASSP 1986, it is suggested that features of the input signal are "masked" by the noise level only when the resulting masked input feature is greater than the level of a corresponding feature of the template(s) of the system.

Both of these methods require an estimate of the interfering noise signal. To obtain this estimate it is necessary for a user to keep silent and to speak a predetermined phrase at particular points in a session. Such an arrangement is clearly unsuitable for a live service using automatic speech recognition, since a user cannot be relied on always to co-operate.

European patent application no. 625774 relates to a speech detection apparatus in which models of speech sounds (phonemes) are generated off-line from training data. An input signal is then compared to each model and a decision is made on the basis of the comparison as to whether the signal includes speech. The apparatus thus determines whether or not an input signal includes any phonemes and, if so, decides that the input signal includes speech. The phoneme models are generated off-line from a large number of speakers to provide a good representation of a cross-section of speakers.

Japanese patent publication no. 1-260495 describes a voice recognition system in which generic noise models are formed, again off-line. At the start of recognition, the input signal is compared to all the generic noise models and that noise model closest to the characteristics of the input signal is identified. The identified noise model is then used to adapt generic phoneme models. This technique presumably depends on a user staying silent for the period in which identification of the noise model is carried out. If a user were to speak, the closest matching noise model will still be identified by may bear very little resemblance to the actual noise present.

Japanese patent publication no. 61-100878 relates to a pattern recognition device which utilises noise subtraction/masking techniques. An adaptive noise mask is used. An input signal is monitored and if a characteristic parameter is identified, this is identified as noise. Those parts of the signal that are identified as noise are masked (i.e. have an amplitude of zero) and the masked input signal is input to a pattern recognition device. The usual characteristic parameter used to identify noise is not identified in this patent application.

European patent application no. 594480 relates to a speech detection method developed, in particular, for use in an avionics environment. The aim of the method is to detect the beginning and end of speech and to mask the intervening signal. Again this is similar to well known masking techniques in which a signal is masked by an estimate of noise taken before speech commences and recognition is carried out on the masked signal.

SUMMARY OF THE INVENTION

In accordance with the present invention speech recognition apparatus comprises:

a store of reference patterns representing speech to be recognised and non-speech sounds;

classification means to identify a sequence of reference patterns corresponding to an input signal and, on the basis of the identified sequence, repeatedly to partition the input signal into at least one speech-containing portion and at least one non-speech portion;

a noise pattern generator for generating a noise pattern corresponding to the non-speech portion, for subsequent use by said classification means for pattern identification purposes;

and output means to supply a recognition signal indicating recognition of the input signal in dependence on the identified sequence.

Thus the noise pattern is generated from a portion of the input signal not deemed to be direct speech and represents an estimate of the interfering noise parameters for the current input signal. Preferably the noise pattern generator is arranged to generate a noise representation pattern after each portion of signal deemed to be speech, the newest noise pattern replacing the previously generated noise pattern.

Preferably the noise representation pattern generator is arranged to generate the noise representation pattern(s) according to the same technique used to generate the original reference patterns. Such an arrangement allows the original reference patterns to be adapted by the generated noise pattern(s). An example of a technique for adapting word models is described in "HMM recognition in noise using parallel model combination" by M J F Gales and S J Young, Proc. Eurospeech 1993 pp 837–840.

The term "word" herein denotes a speech unit, which may be a word but equally well may be a diphone, phoneme, allophone etc. The reference patterns may be Hidden Markov Models (HMMs), Dynamic Time Warped (DTW) models, templates, or any other suitable word representation model. The processing which occurs within a model is irrelevant as far as this invention is concerned. Recognition is the process of matching an unknown utterance with a predefined transition network, the network having been designed to be compatible with what a user is likely to say.

In accordance with a second aspect of the invention there is provided a method of pattern recognition comprising:

comparing an input signal with each of a plurality of reference patterns;

identifying a sequence of reference patterns that corresponds to the input signal and indicating recognition of the input signal in dependence on the identified sequence;

identifying portions of the input signal that are deemed not to correspond to allowable reference patterns;

from those portions of the input signal that are identified as not corresponding to allowable reference patterns, generating an additional reference pattern for use in subsequent comparison.

In accordance with a further aspect of the invention there is provided pattern recognition apparatus comprising:

a store of reference patterns;

comparison means for comparing successive portions of an input signal with each of the reference patterns and, for each portion, identifying that reference pattern that most closely matches the portion;

an output for outputting a signal indicating recognition of the input signal on the basis of the sequence of reference patterns deemed to correspond to the input signal;

means for identifying a portion of the input signal which is deemed not to correspond to an allowable reference pattern; and means for generating a reference pattern from the identified portion of the input signal, for subsequent use by the comparison means.

The allowable patterns may represent words (as defined above) of the vocabulary of the recogniser. "Non-allowable" reference patterns preferably representing non-speech sounds e.g. mechanical noise, street noise, car engine noise may also be provided. A reference pattern representing generic speech sounds may also be provided. Thus any portion of an input signal that does not closely match an allowable reference pattern may be used to generate an additional reference pattern.

BRIEF DESCRIPTION OF THE DRAWINGS

The invention will now be described further by way of example only, with reference to the accompanying drawings in which.

DETAILED DESCRIPTION OF EXEMPLARY EMBODIMENTS

One well known approach to statistical signal modelling uses Hidden Markov Models (HMMs) as described in the article "Hidden Markov Models for Automatic Speech Recognition: Theory and Application" by S J Cox, British Telecom Technology Journal, April 1988, Vol. 6, No. 2 pages 105–115. The invention will be described with reference to the use of HMMs. The invention is not limited to statistical models however; any suitable pattern-recognition approach may be used. The theory and practical implementation of HMMs are well known in the art of speech recognition and will not be described further here.

Figure 1:
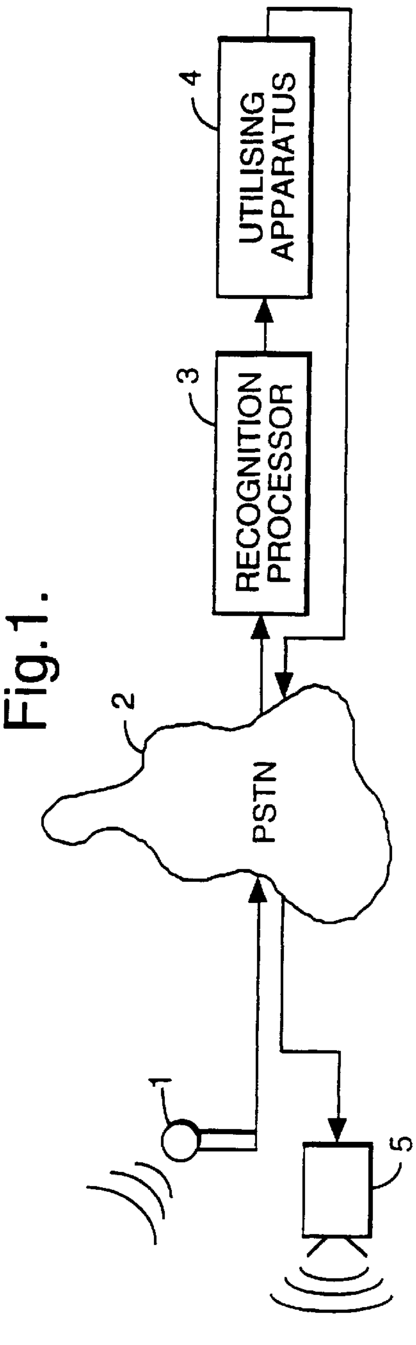
FIG. 1 shows schematically the employment of a pattern recognition apparatus according to the invention in an interactive automated speech system in a telecommunications environment.

Referring to FIG. 1, a telecommunications system including speech recognition generally comprises a microphone 1 (typically forming part of a telephone handset), a telecommunications network 2 (typically a public switched telecommunications network (PSTN)), a speech recognition processor 3, connected to receive a voice signal from the network 2, and a utilising apparatus 4 connected to the speech recognition processor 3 and arranged to receive therefrom a voice recognition signal, indicating recognition or otherwise of a particular word or phrase, and to take action in response thereto. For example, the utilising apparatus 4 may be a remotely operated banking terminal for effecting banking transactions.

In many cases, the utilising apparatus 4 will generate an audible response to the user, transmitted via the network 2 to a loudspeaker 5 typically forming part of the user's handset.

In operation, a user speaks into the microphone 1 and a signal is transmitted from the microphone 1 into the network 2 to the speech recognition processor 3. The speech recognition processor analyses the speech signal and a signal indicating recognition or otherwise of a particular word or phrase is generated and transmitted to the utilising apparatus 4, which then takes appropriate action in the event of recognition of the speech.

The speech recognition processor 3 is ignorant of the route taken by the signal from the microphone 1 to and through network 2. Any one of a large variety of types or qualities of handset may be used. Likewise, within the network 2, any one of a large variety of transmission paths may be taken, including radio links, analogue and digital paths and so on. Accordingly the speech signal Y reaching the speech recognition processor 3 corresponds to the speech signal S received at the microphone 1, convolved with the transform characteristics of the microphone 1, the link to the network 2, the channel through the network 2, and the link to the speech recognition processor 3, which may be lumped and designated by a single transfer characteristic H.

Figure 2:
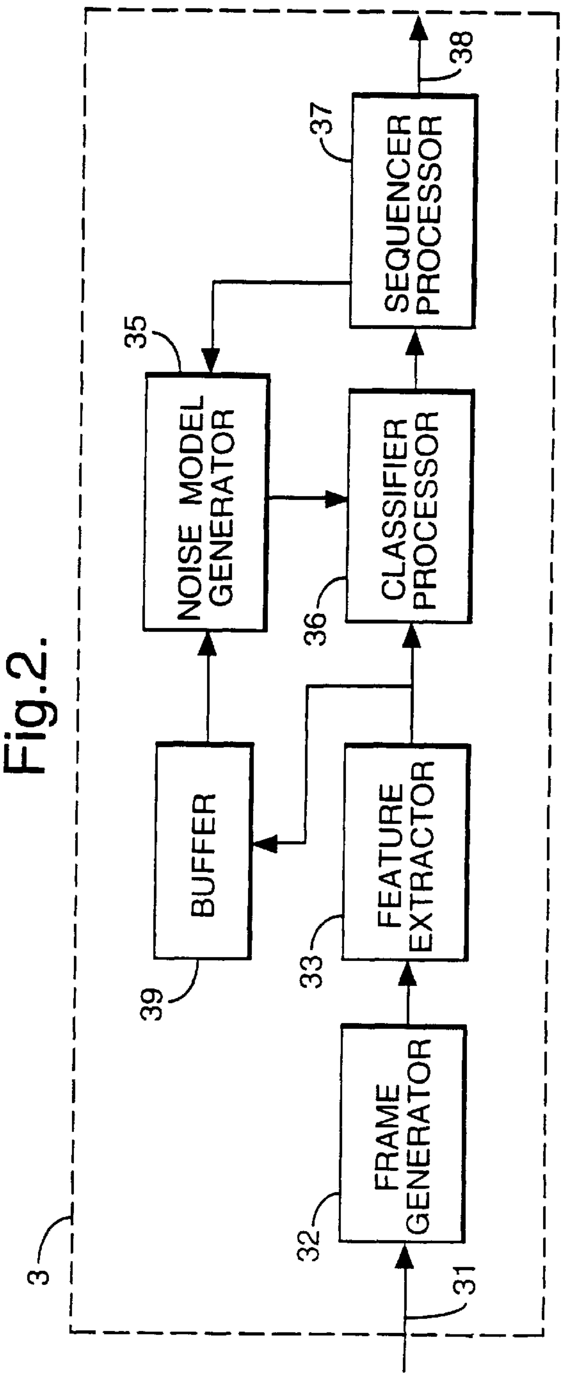
FIG. 2 shows the functional elements of a speech recognition apparatus according to the invention.

Referring to FIG. 2, the recognition processor 3 comprises an input 31 for receiving speech in digital form (either from a digital network or from an analogue to digital converter), a frame generator 32 for partitioning the succession of digital samples into a succession of frames of contiguous samples; a feature extractor 33 for generating from a frame of samples a corresponding feature vector; a noise representation model generator 35 for receiving frames of the input signal and generating therefrom noise representation models; a classifier 36 for receiving the succession of feature vectors and comparing each with a plurality of models, to generate recognition results; a sequencer 37 which is arranged to receive the classification results from the classifier 36 and to determine the predetermined utterance to which the sequence of classifier output indicates the greatest similarity; and an output port 38 at which a recognition signal is supplied indicating the speech utterance which has been recognised.

Frame Generator 32

The frame generator 32 is arranged to receive a speech signal comprising speech samples at a rate of, for example, 8,000 samples per second, and to form frames comprising 256 contiguous samples (i.e. 32 ms of the speech signal), at a frame rate of 1 frame every 16 ms. Preferably, each frame is windowed (i.e. the samples towards the edge of the frame are multiplied by predetermined weighting constants) using, for example, a Hamming window to reduce spurious artefacts, generated by the frames' edges. In this preferred embodiment, the frames are overlapping (by 50%) so as to ameliorate the effects of the windowing.

Feature Extractor 33

The feature extractor 33 receives frames from the frame generator 32 and generates, in each case, a set or vector of features. The features may, for example, comprise cepstral coefficients (for example, linear predictive coding (LPC) cepstral coefficients or mel frequency cepstral coefficients (MFCC) as described in "On the Evaluation of Speech Recognisers and Databases using a Reference System", Chollet & Gagnoulet, 1982 proc. IEEE p2026), or differential values of such coefficients comprising, for each coefficient, the differences between the coefficient and the corresponding coefficient value in the preceding vector, as described in "On the use of Instantaneous and Transitional Spectral Information in Speaker Recognition", Soong & Rosenberg, 1988 IEEE Trans. on Acoustics, Speech and Signal Processing Vol. 36 No. 6 p871. Equally, a mixture of several types of feature coefficient may be used.

Finally, the feature extractor 33 outputs a frame number, incremented for each successive frame. The feature vectors are input to the classifier 36 and the noise model generator 35. A FIFO buffer 39 buffers the feature vectors before they are passed to the noise model generator 35.

The frame generator 32 and feature extractor 33 are, in this embodiment, provided by a single suitably programmed digital signal processor (DSP) device (such as the Motorola ™ DSP 56000, or the Texas™ Instruments TMS C 320) or similar device.

Classifier 36

Figure 3:
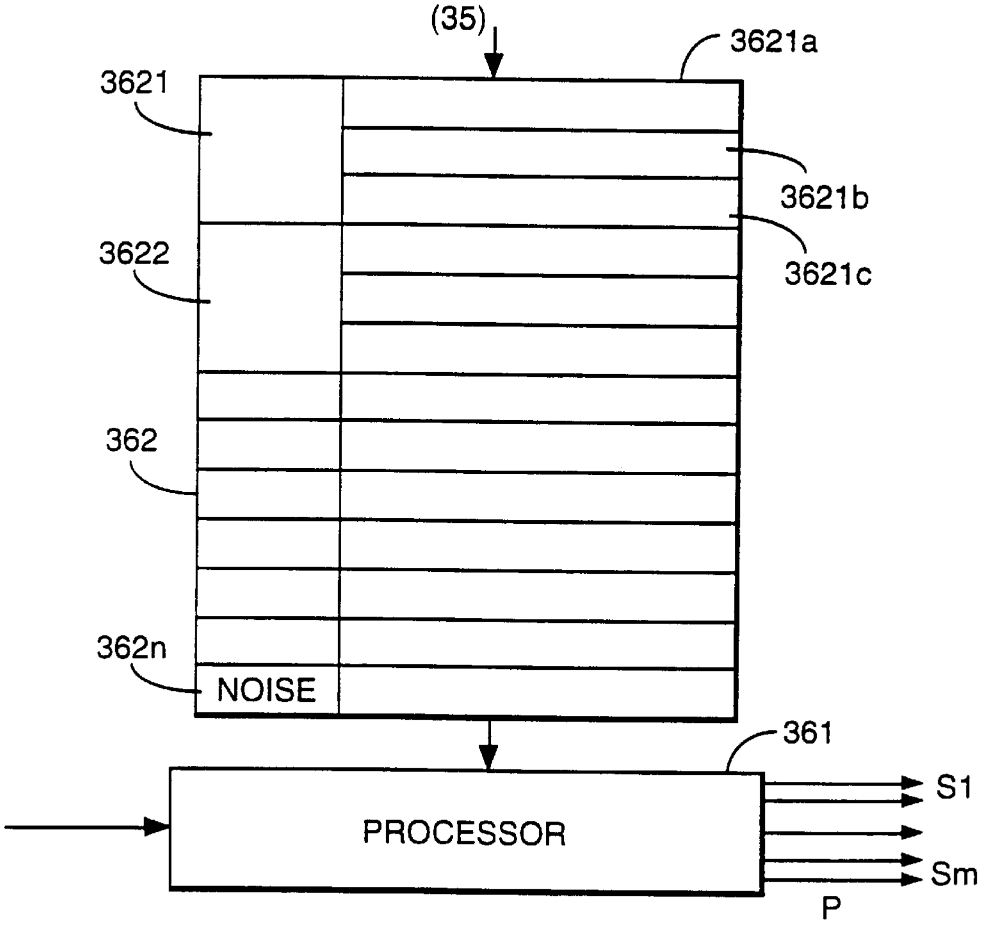
FIG. 3 is a block diagram showing schematically the functional elements of a classifier processor forming part of the speech recognition apparatus of FIG. 2.

Referring to FIG. 3, in this embodiment, the classifier 36 comprises a classifying processor 361 and a state memory 362.

The state memory 362 comprises a state field 3621, 3622, . . . , for each of the plurality of speech units to be recognised e.g. allophones. For example, each allophone to be recognised by the recognition processor is represented by an HMM comprising three states, and accordingly three state fields 3621*a*, 3621*b*, 3621*c* are provided in the state memory 362 for storing the parameters for each allophone.

The state fields store the parameters defining a state of an HMM representative of the associated allophone, these parameters having been determined in a conventional manner from a training set of data. The state memory 362 also stores in a state field 362*n* parameters modelling an estimate of average line noise, which estimate is generated off-line in the conventional manner, e.g. from signals from a plurality of telephone calls.

The classification processor 36 is arranged, for each frame input thereto, to read each state field within the memory 362 in turn, and calculate for each, using the current input feature coefficient set, the probability $P_i$ that the input feature set or vector corresponds to the corresponding state.

Accordingly, the output of the classification processor is a plurality of state probabilities $P_i$, one for each state in the state memory 362, indicating the likelihood that the input feature vector corresponds to each state.

The classifying processor 361 may be a suitably programmed digital signal processing (DSP) device, and may in particular be the same digital signal processing device as the feature extractor 33.

Sequencer 37

Figure 4:
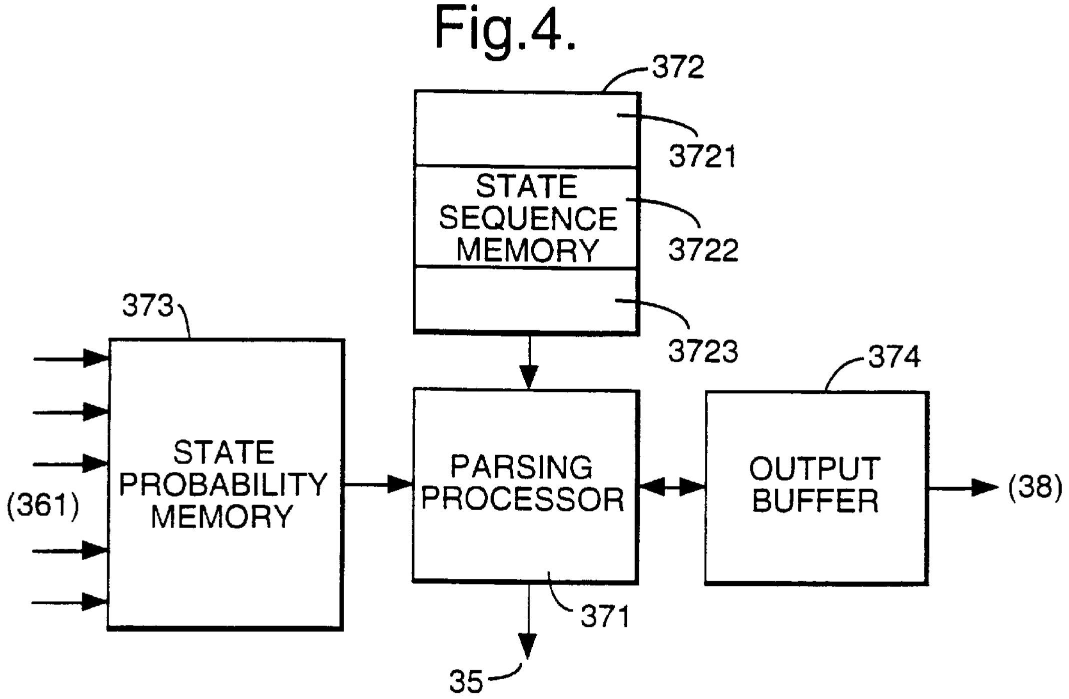
FIG. 4 is a block diagram showing schematically the functional elements of a sequencer forming part of the speech recognition apparatus of FIG. 2.

Referring to FIG. 4, the sequencer 37 in this embodiment comprises a state sequence memory 372, a parsing processor 371, and a sequencer output buffer 374.

Also provided is a state probability memory 373 which stores, for each frame processed, the outputs of the classifier processor 361. The state sequence memory 372 comprises a plurality of state sequence fields 3721, 3722, . . . , each corresponding to a word or phrase sequence to be recognised consisting of a string of allophones and noise.

Figure 5:
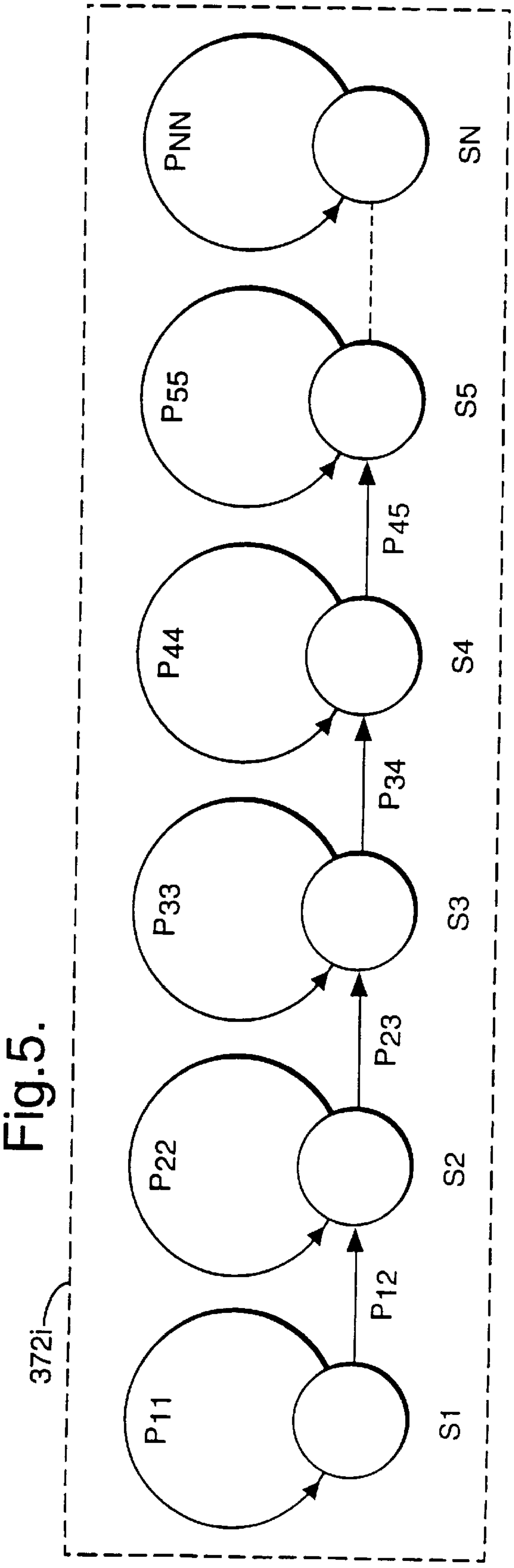
FIG. 5 is a schematic representation of a field within a store forming part of FIG. 4.

Each state sequence in the state sequence memory 372 comprises, as illustrated in FIG. 5, a number of states $S_1$, $S_2$, . . . $S_N$ and, for each state, two probabilities; a repeat probability ($P_{ii}$) and a transition probability to the following state ($P_{i\ i+1}$). The states of the sequence are a plurality of groups of three states each relating to a single allophone and, where appropriate, noise. The observed sequence of states associated with a series of frames may therefore comprise several repetitions of each state $S_i$ in each state sequence model 372*i* etc; for example:

| | Frame number | | | | | | | | | | | |
|---|---|---|---|---|---|---|---|---|---|---|---|---|
| | 1 | 2 | 3 | 4 | 5 | 6 | 7 | 8 | 9 | . . . | Z | Z + 1 |
| State | S1 | S1 | S1 | S2 | S2 | S2 | S2 | S2 | S2 | . . . | Sn | Sn |

The parsing processor 371 is arranged to read, at each frame, the state probabilities stored in the state probability memory 373, and to calculate the most likely path of states to date over time, and to compare this with each of the state sequences stored in the state sequence memory 372. For example the state sequences may comprise the names in a telephone directory or strings of digits.

The calculation employs the well known Hidden Markov Model method described in the above referenced Cox paper. Conveniently, the HMM processing performed by the parsing processor 371 uses the well known Viterbi algorithm. The parsing processor 371 may, for example, be a microprocessor such as the Intel™ i-486™ microprocessor or the Motorola™ 68000 microprocessor, or may alternatively be a DSP device (for example, the same DSP device as is employed for any of the preceding processors).

Accordingly for each state sequence (corresponding to a word, phrase or other speech sequence to be recognised) a probability score is output by the parsing processor 371 at each frame of input speech and stored in the output buffer 374. Thus the buffer 374 includes, for each frame of the input signal and for each sequence, a probability score, a recond of the frame number and a record of the state model to which the probability score relates. When the end of the utterance is detected, a label signal indicating the most probable state sequence is output from the buffer to the output port 38, to indicate that the corresponding name, word or phrase has been recognised.

Figure 6:
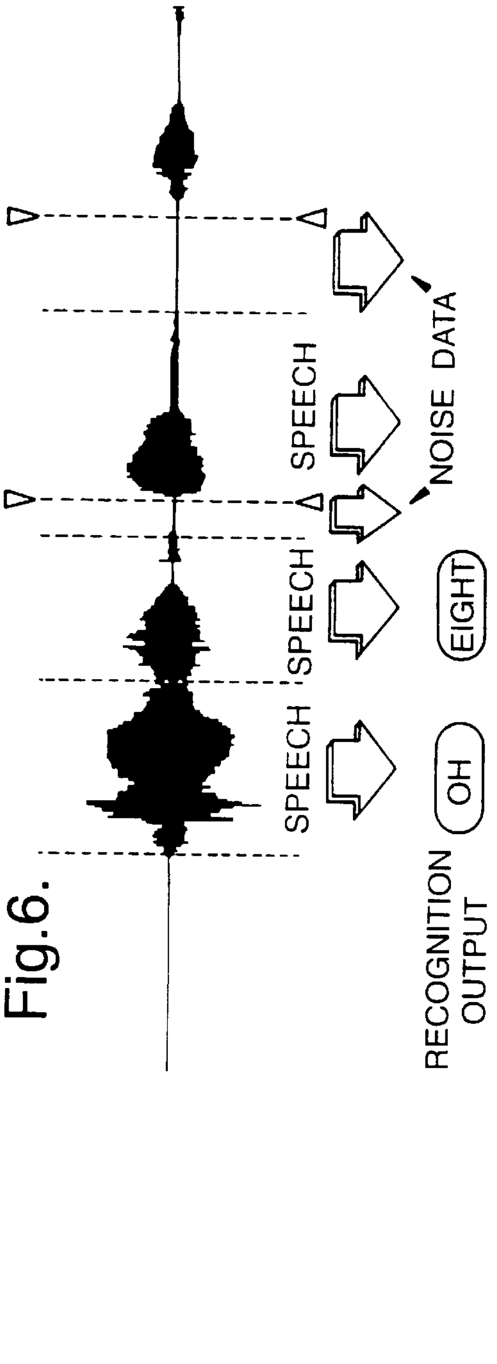
FIG. 6 illustrates the partitioning performed by the sequencer of FIG. 4.

The sequencer processor then examines the information included in the buffer 374 and identifies, by means of the frame number, portions of the input signal which are recognised as being within the vocabulary of the speech recognition apparatus (herein referred to as speech portions) and portions of the input signal which are not deemed to be within the vocabulary (hereinafter referred to as "noise portions"). This is illustrated in FIG. 6. The sequence processor 37 then passes the frame numbers making up these noise portions to the noise model generator 35 which then generates a local noise model. The sequencer 37 is arranged to provide a safety margin of several frames (e.g. three) on either side of the deemed speech portions of the input signal to prevent speech data being included in the noise portions due to inaccuracies in the end pointing of the speech portions by the Viterbi recognition algorithm. A minimum constraint of, for instance, six consecutive frames is also applied to define a noise portion. This prevents spurious frames, which appear similar to the modelled noise, being used to generate a local noise model.

Noise Model Generator 35

The feature vectors for the frames contained within the noise portions of the input signal identified by the sequence processor 37 are input to the noise model generator 35 from the buffer 39. The noise model generator generates parameters defining an HMM which models the feature vectors input thereto. The noise representation model generator 35 is arranged to generate an HMM having a single state, however all other parameters (transitional probabilities, number of modes etc.) may vary.

Figure 7:
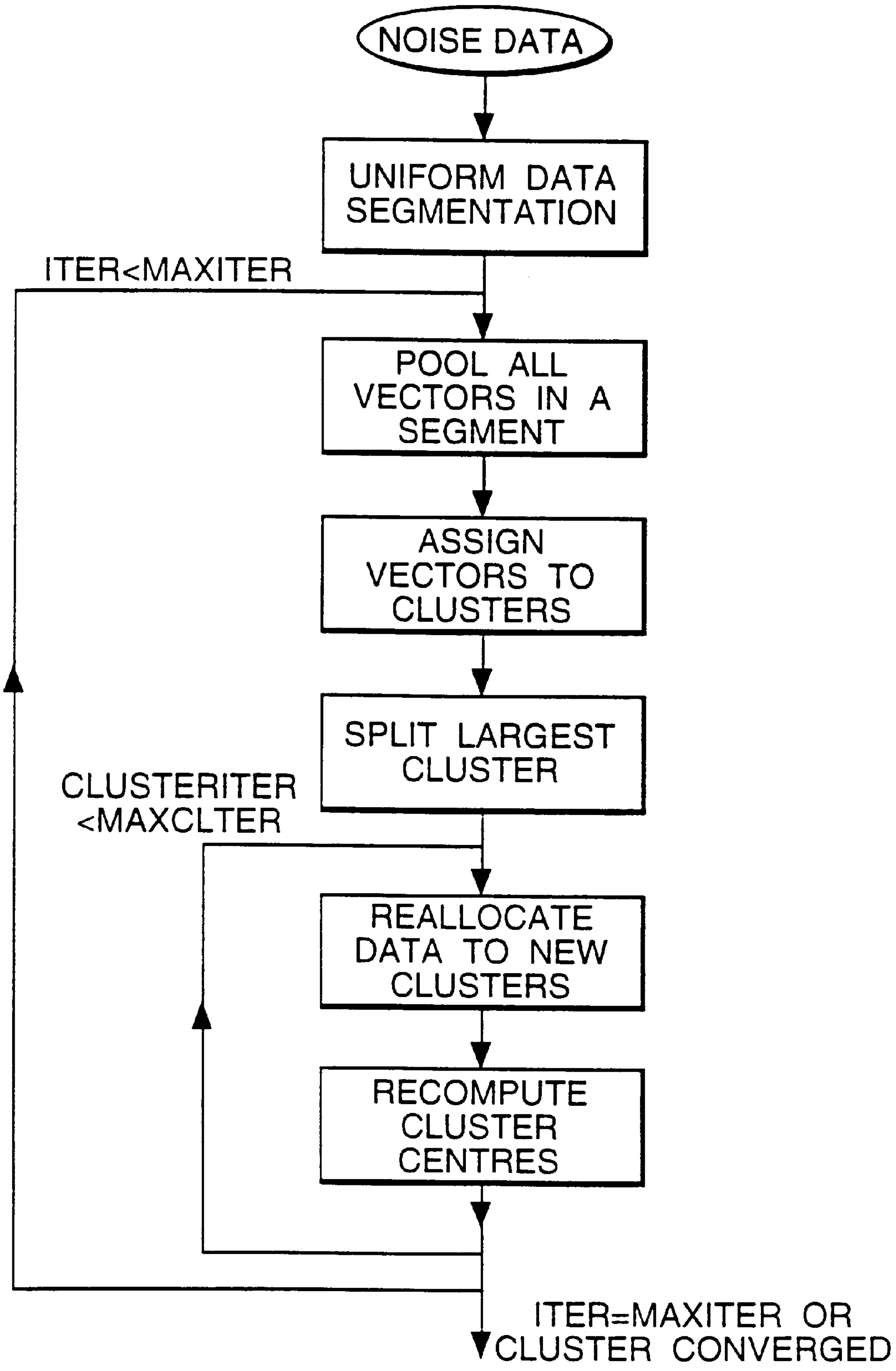
FIG. 7 shows a flow diagram for the generation of a local noise model.

The noise model is generated using a conventional clustering algorithm as illustrated in FIG. 7. Such an algorithm is described in the article "Algorithm for vector quantiser design" by Y. Linde, A Buzo and R M Gray, IEEE Trans Com-28 January 1980. The input data is uniformly segmented according to the number of states to be calculated and all segments of a particular label (i.e. state of an HMM) are pooled. A number of clusters are then selected relating to the number of modes for each state. Each vector in a pool is then allocated to the pool cluster (state mean) whose centre is the closest, using a Euclidean distance metric. The cluster with the largest average distance is then split, this 'loosest' cluster assumed to be least representative of the underlying distribution. The split is achieved by perturbing the centre vector of the cluster by say ±0.1 standard deviations or ±0.5. All data vectors are then reallocated to the new set of clusters, and the cluster centres recalculated. The reallocation/recalculation loop is repeated until the clusters converge or the maximum number of cluster iterations is reached, so producing an estimate of the local noise. HMM parameters are then calculated to model this estimate. The noise model produced by the noise model generator 35 is passed to the classifier 36 and stored in the state memory 362 for subsequent recognition.

As explained above, the sequencer processor 371 is associated with sequences (3721, 3722 . . . ) of state models specifically configured to recognise certain phrases or words, for example a string of digits. Such sequences of state models may be represented, in a simplified form, as a recognition network for instance as shown in FIG. 8.

Figure 8:
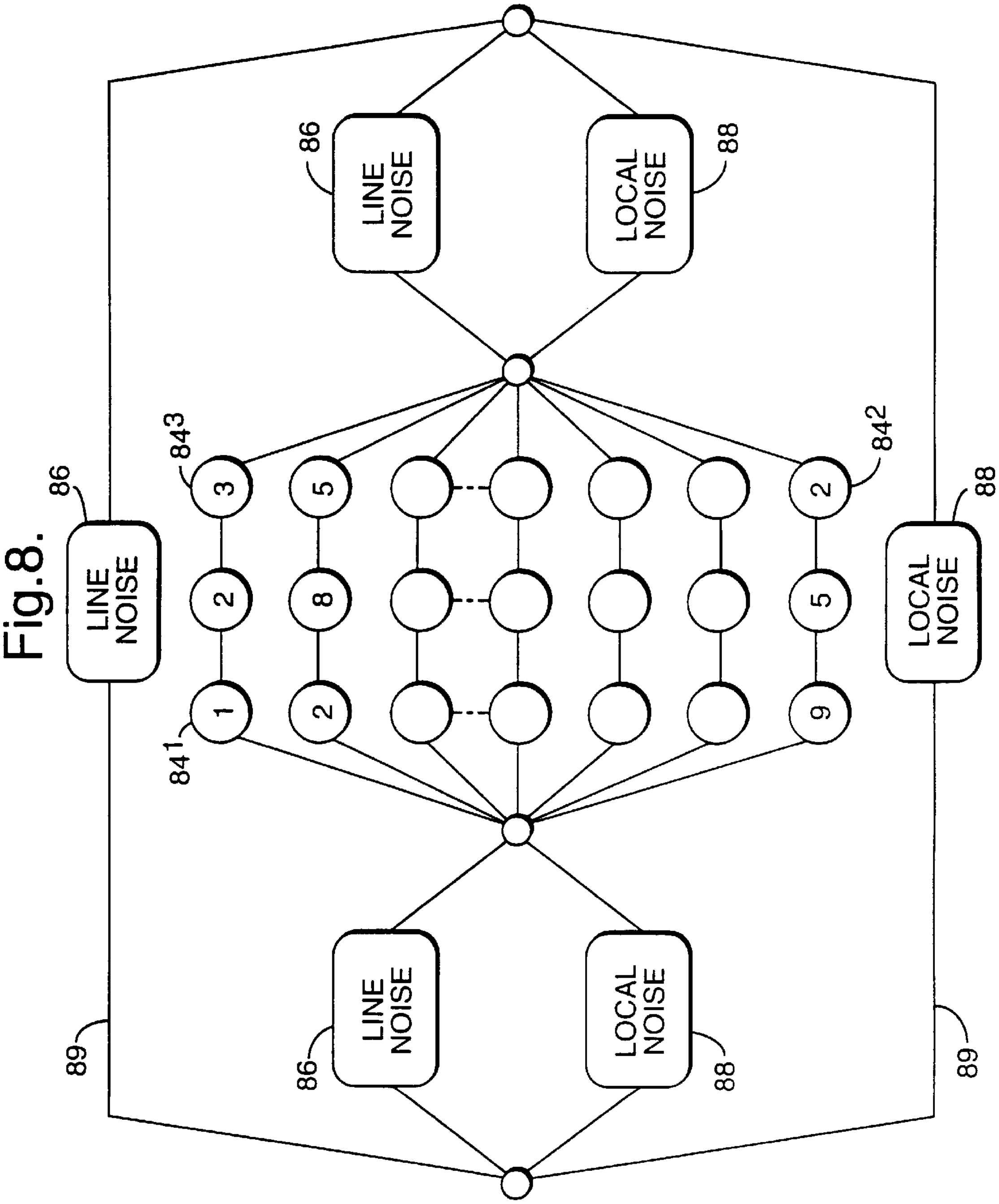
FIG. 8 is a schematic representation of a recognition network.

FIG. 8 shows a recognition network 82 designed to recognise strings of three digits. In practice the digits are represented by strings of allophones as discussed in relationship to FIG. 6. However, for simplicity, the network of FIG. 8 is shown as a string of nodes 84, each of which represents the whole digit. The strings of digits are bounded on either side by noise nodes 86, 88. Each node 84, 86, 88 of the network is associated with the model representing the digit of that node i.e. node $\mathbf{84}^1$ is associated with a model representing the word "one"; node $\mathbf{84}^2$ is associated with a model representing the word "two"; node $\mathbf{84}^3$ is associated with a model representing the word "three" etc. Initially only a pre-generated line noise model, associated with the noise nodes 86, is available, as is conventional. The models of the digits 1–9, nought, zero, "oh" and the line noise are stored in the state memory 362 as parameters defining HMMs. The noise models generated by the noise model generator 35, associated with the noise nodes 88, are also stored in the state memory 362. Noise only paths 89 are also provided.

The speech recognition operates as follows. An input signal is separated into frames of data by the frame generator 32. The feature extractor 33 generates a feature vector from each frame of data. The classifier 36 compares the feature vectors of the input signal with each state field (or model) stored in the state field store 362 and outputs a plurality of probabilities, as described above. The sequencer 37 then outputs a score indicative of the closeness of the match between the input and the allowed sequences of states and determines which sequence of states provides the closest match. The sequence which provides the closest match is deemed to represent the utterance recognised by the device.

The sequencer identifies those frames of the input signal which are deemed to represent noise portions of the signal. This information is passed to the noise model generator 35 which receives the feature vectors for the identified frames from the feature extractor and calculates the parameters for a single state HMM modelling the feature vectors input thereto.

Once the noise model generator has generated the parameters of a model representing the local noise, these parameters (the "local noise model") are stored in a state field of the state memory 362. A second recognition run is then performed on the same input signal using the local noise model. Subsequent recognition runs then use both the line noise model and the local noise model, as shown schematically in FIG. 8.

Experiments carried out to evaluate the effectiveness of one embodiment of apparatus according to the invention indicate that a significant improvement is achieved. An "optimum performance" or "matched" system, for which the input signal was manually partitioned into speech and noise portions, correctly recognised 96.01% of words input thereto. A system which used only a generic line noise model correctly recognised 92.40% of the words. Apparatus according to the invention, in which a single estimate of the local noise was generated per call and a single mode, single state HMM calculated, correctly recognised 94.47% of the user's utterances.

According to a further embodiment of the invention, a new local noise model is generated after each speech portion of the input signal and is stored in the state memory 362, overwriting the previous local noise model. This means that the noise model is more representative of the actual, potentially changing, conditions rather than being generated from a sample of noise from the start of a session, e.g. a telephone call.

The estimate of the local noise may be used to adapt the word representation models. This is a comparatively straight-forward technique since ambient noise is usually considered to be additive i.e. the input signal is a sum of the speech signal and the ambient noise.

Figure 9:
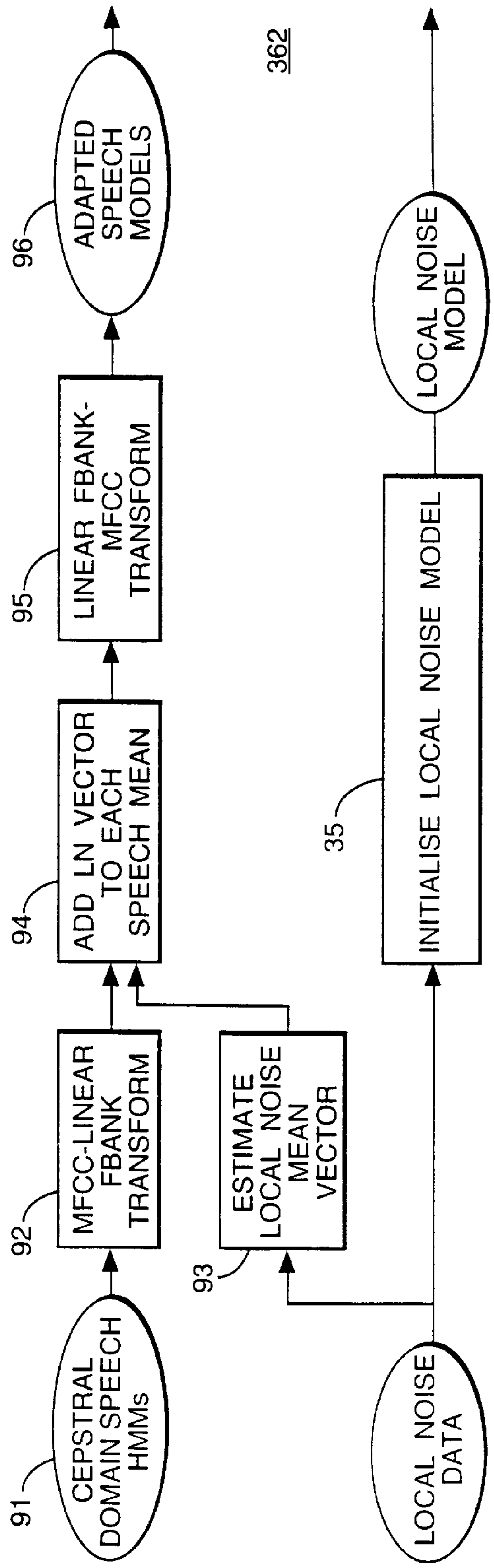
FIG. 9 shows a second embodiment of noise model generator for use with speech recognition apparatus according to the invention.

The word representation model adaptation is carried out in the linear filter bank domain. FIG. 9 shows the stages of the adaptation. In this embodiment, each word representation model or state stored in the state field store 362 comprises a plurality of mel-frequency cepstral coefficients (MFCCs) (91) which represent typical utterances of the words in the mel-frequency domain. Each cepstral coefficient of a word model is transformed (92) from the cepstral domain into the frequency domain e.g. by performing an inverse discrete cosine transform (DCT) on the cepstral coefficients and then taking the inverse logarithm, to produce frequency coefficients. The estimated local noise model feature vector (93), generated by the noise model generator 35, is then added (94) to the word model's frequency coefficients. The log of the resulting vector is then transformed (95) by a discrete cosine transform (DCT) back into the cepstral domain to produce adapted word models (96) and the adapted models stored in the state memory 362 of the classifier 36. The resulting adapted word representation models simulate matched conditions. The original word representation models (91) are retained to be adapted by subsequently generated noise representation models to form new adapted word representation models.

Figure 10:
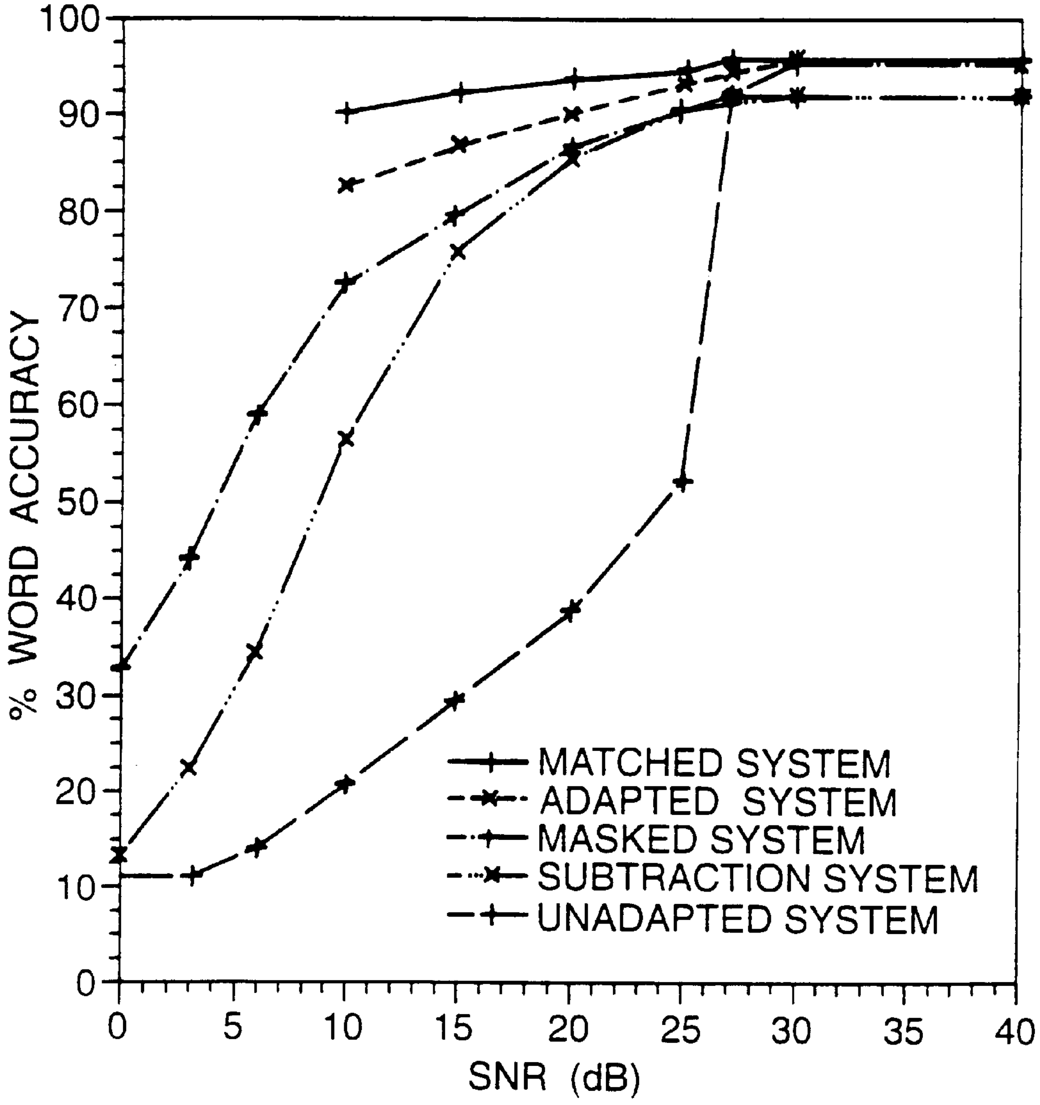
FIG. 10 shows the relative performance of various recognition systems.

FIG. 10 shows the performance of an embodiment of speech recognition apparatus according to the invention incorporating adaptation of the word representation models. Results are shown for a "matched" system, an "adapted" system according to the invention, a "masked" system (as described above), a "subtracted" system (as described in "Suppression of acoustic noise in speech using spectral subtraction" by S Boll, IEEE Trans. ASSP April 1979 page 113), and an uncompensated system i.e. a system with a general line noise model but no further compensation. The advantages provided by the invention can clearly be seen, the performance of a system according to the invention being 10% more accurate than a noise-masked system and 26% more accurate than a spectral subtraction system at 10 dB signal to noise ratio (SNR).

What is claimed is:

1. Speech recognition apparatus comprising:

a store of reference patterns representing speech to be recognised and non-speech sounds;

classification means to identify a sequence of said reference patterns corresponding to an input signal and, on the basis of the identified sequence, repeatedly to partition the input signal into at least one speech-containing portion and at least one non-speech portion;

a reference pattern generator for generating a new reference pattern corresponding to the said non-speech portion of the current input signal for subsequent use by said classification means for pattern identification purposes; and output means to supply a recognition signal indicating recognition of the input signal in dependence on the identified sequence.

2. Speech recognition apparatus as in claim 1 wherein the reference pattern generator is arranged to generate a pattern from each non-speech portion of the speech signal.

3. Speech recognition apparatus as in claim 1 wherein the reference pattern generator is arranged to generate a reference pattern only if the duration of the non-speech portion of the input signal is greater than or equal to a predetermined duration.

4. Speech recognition apparatus as in claim 1 wherein the reference pattern generator calculates the parameters for a Hidden Markov model from the non-speech portion.

5. Speech recognition apparatus as in claim 1 wherein adaptation means are provided to adapt the speech reference patterns in response to the generated reference pattern.

6. Speech recognition apparatus as in claim 4 wherein adaptation means are provided to adapt the speech reference patterns in response to the generated reference pattern, the adaptation means being arranged to add the mean of the reference pattern to the Hidden Markov models for each of the speech reference patterns.

7. A method of pattern recognition comprising:

comparing an input signal with each of a plurality of allowable and non-allowable reference patterns;

identifying a sequence of reference patterns that corresponds to the input signal and indicating recognition of the input signal in dependence on the identified sequence;

identifying one or more portions of the input signal that is deemed not to correspond to allowable reference patterns;

generating an additional non-allowable reference pattern for use in subsequent comparison from the identified portion of the input signal.

8. A method as in claim 7 wherein an additional reference pattern is generated from each said portion of the input signal.

9. A method as in claim 7 wherein an additional reference pattern is generated only if the duration of the said portion of the input signal is greater than or equal to a predetermined duration.

10. Pattern recognition apparatus comprising:

a store of allowable and non-allowable reference patterns;

comparison means for comparing successive portions of an input signal with each of the reference patterns and identifying a sequence of reference patterns that corresponds to the input signal;

an output for outputting a signal indicating the sequence of reference patterns deemed to correspond to the input signal;

means for identifying one or more portions of the input signal which is deemed not to correspond to an allowable reference pattern; and means for generating an additional non-allowable reference pattern from the identified portion of the input signal for subsequent use by the comparison means.

11. Pattern recognition apparatus as in claim 10 wherein a reference pattern is generated from each portion of the input signal which is deemed not to correspond to an allowable reference pattern.

12. Pattern recognition apparatus as in claim 10 wherein the allowable reference patterns represent speech sounds and the input signal represents speech.

* * * * *